Patented Aug. 22, 1944

2,356,126

UNITED STATES PATENT OFFICE 2,356,126

BATHING CAP

Béla Szekeres, Budapest, Hungary; vested in the Alien Property Custodian

No Drawing. Application August 6, 1940, Serial No. 351,649. In Hungary August 22, 1939

1 Claim. (Cl. 2—68)

Bathing caps with embossed patterns are known. Until now such bathing caps have been made either by pressing out the mass of plastic raw rubber around a core provided with patterns vulcanised thereon, or by drawing rubber sheets through engraved rollers, the said rubber sheets consisting of pieces having raised patterns following the contours of the cap, whereupon two cap-halves cut out from the sheet are united along a seam and vulcanised. However these bathing caps having relief ornamentations thereon are not only rather expensive, but owing to the relatively considerable weight of the whole rubber ornamentation the wearing of these caps becomes inconvenient after a short time.

Bathing caps with raised patterns of light weight have been produced also by means of less expensive methods, in which the external embossed ornamentation of the cap appears on the inner side as a concave negative pattern. Such caps have been made by dipping moulds provided with patterns into aqueous rubber dispersions, or by applying suction to raw rubber sheets through porous moulds, which operations are in each case concluded by the vulcanisation of the raw rubber caps on the moulds.

These light weight caps have been objectionable in that their raised patterns were shallowed or flattened out in use, especially at those portions which were subject to greater stress.

This invention relates to a bathing cap which is provided with one or more hollow embossed ornamentations. Such embossed ornamentations may consist of a closed hollow body with a relief patterned surface, which hollow body may be applied to any desired part of the bathing cap. However, the hollow embossed pattern can be produced also in such manner that a rubber sheet having a raised pattern, when applied to the surface of the cap, encloses therewith the cavity of the hollow embossed ornamentation. The cavity of the hollow ornamentation may be completely closed, although it is not at all essential that it should be airtightly sealed. The hollow embossed ornamentation may be in the form of decorative figures of any desired shape, colour or execution, such as for instance geometrical forms, human or animal figures, bows, and the like.

The weight of the bathing cap according to the present invention is comparatively light, as compared with other bathing caps having embossed patterns and furthermore the raised patterns also remain unchanged and undisturbed during the wearing of the caps. Consequently the use of the caps according to the invention offers numerous advantages.

The embossed rubber pattern can be produced in different ways. Generally, it is made independently from the cap, for instance by pressing out in suitable pressing forms. Preferably, however it is produced directly from a mixture of an aqueous rubber dispersion by means of any known shaping process such as for instance dipping, and electro-phoresis. The uniting of the raised rubber pattern with the cap proper can also be effected in any desired manner, either in that the cap and the hollow embossed pattern are separately vulcanised and united with each other, for instance by adhesion or in that the raw cap together with the raw raised rubber pattern applied thereto are definitely united by vulcanisation.

It has already been known to make bathing caps from a material consisting of two thin wrinkled rubber sheets, the wrinkles of which have each enclosed air in their cavities. The aligned air-filled rows of wrinkles have given the material practically the appearance of a new working material, so that the cap had rather the character of a textile cap than that of a rubber cap. In contradistinction thereto, the bathing cap according to the present invention completely retains the character of a rubber cap, owing to the hollow embossed ornamentation being applied at certain places only.

Having now particularly described and ascertained the nature of my said invention and in what manner the same is to be performed, I declare that I claim as:

A method for making two-ply ornamented bathing caps, comprising first making a main rubber cap body from a layer of flat material, embossing spaced convexo-concave ornamentations in a separate single rubber sheet member, by depositing an aqueous rubber dispersion onto a mould provided with spaced patterns for forming said convexo-concave ornamentations, then enclosing the concave ornamentations of said separate single sheet member with the exterior surface of said main cap body, and then securing the unembossed surface of said single rubber sheet member to said main body so as to form closed hollow spaces between said embossed member and said main body, whereby the shape of said hollow spaces will be substantially maintained by said main rubber cap body.

BÉLA SZEKERES.